Aug. 14, 1951    J. G. LOCKE    2,563,947
MACHINE FOR MANUFACTURING AND ASSEMBLING
FILLER PARTITIONS
Filed Aug. 28, 1946    12 Sheets-Sheet 4
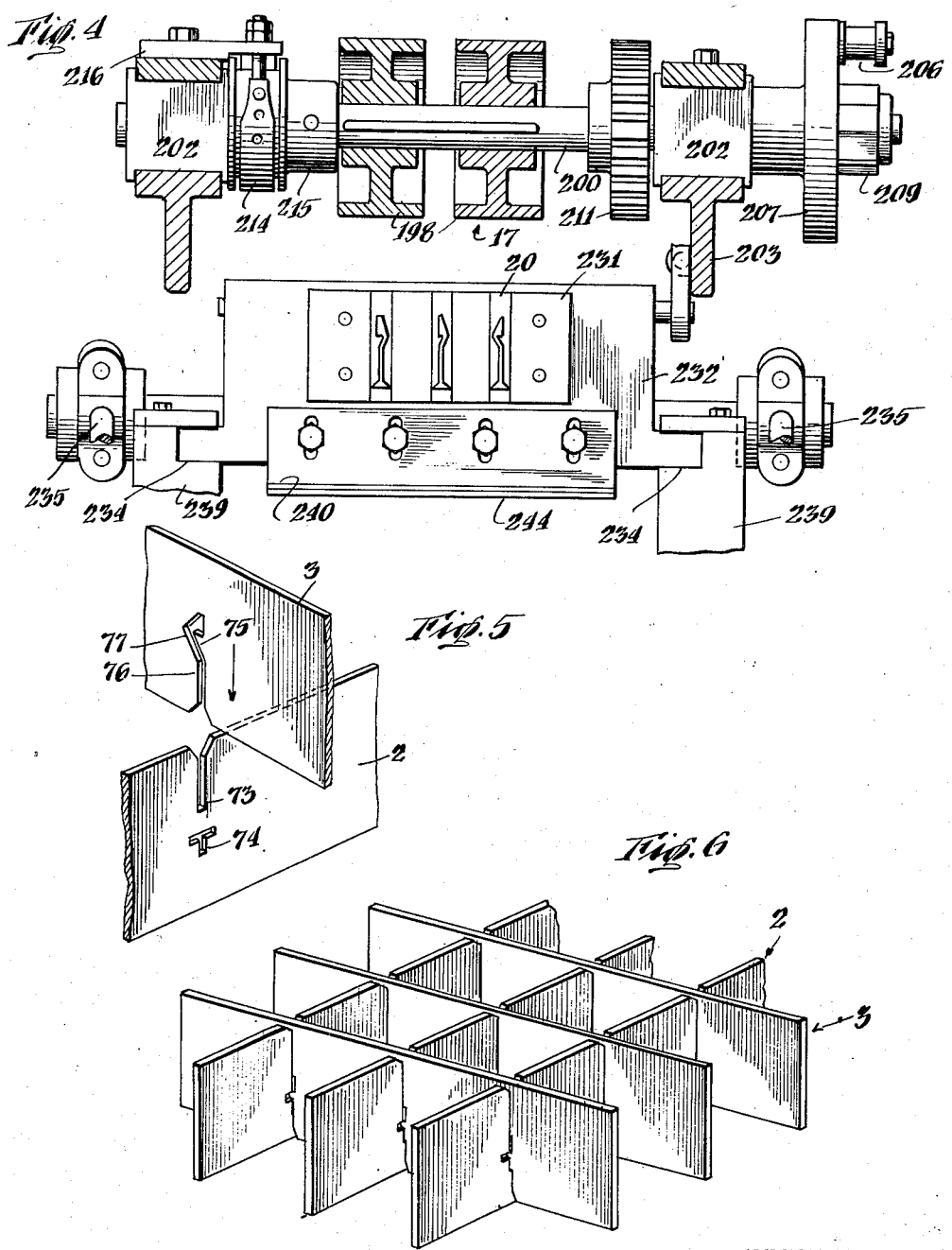
INVENTOR
Jewett G. Locke
BY
Norman N. Holland
ATTORNEY

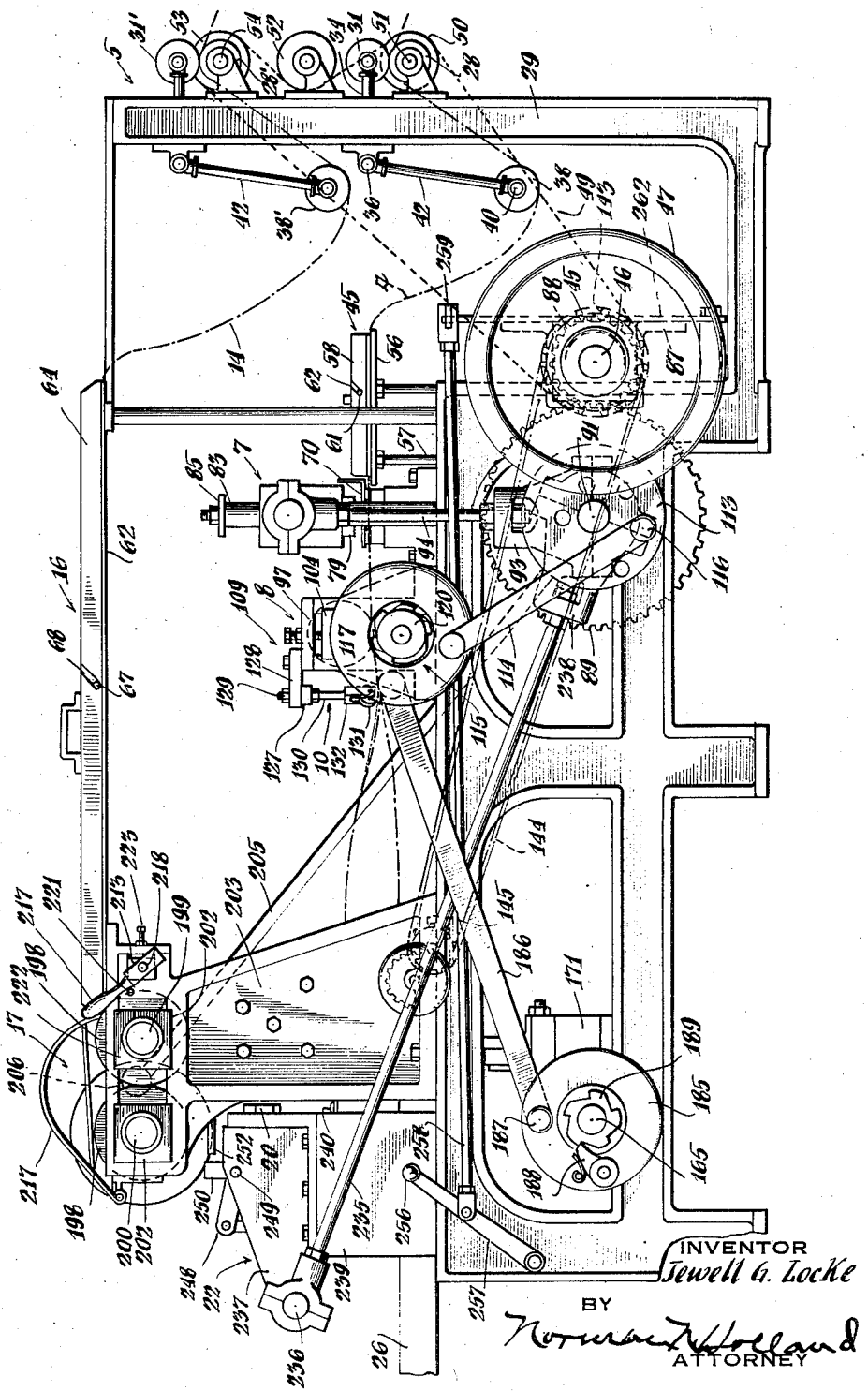

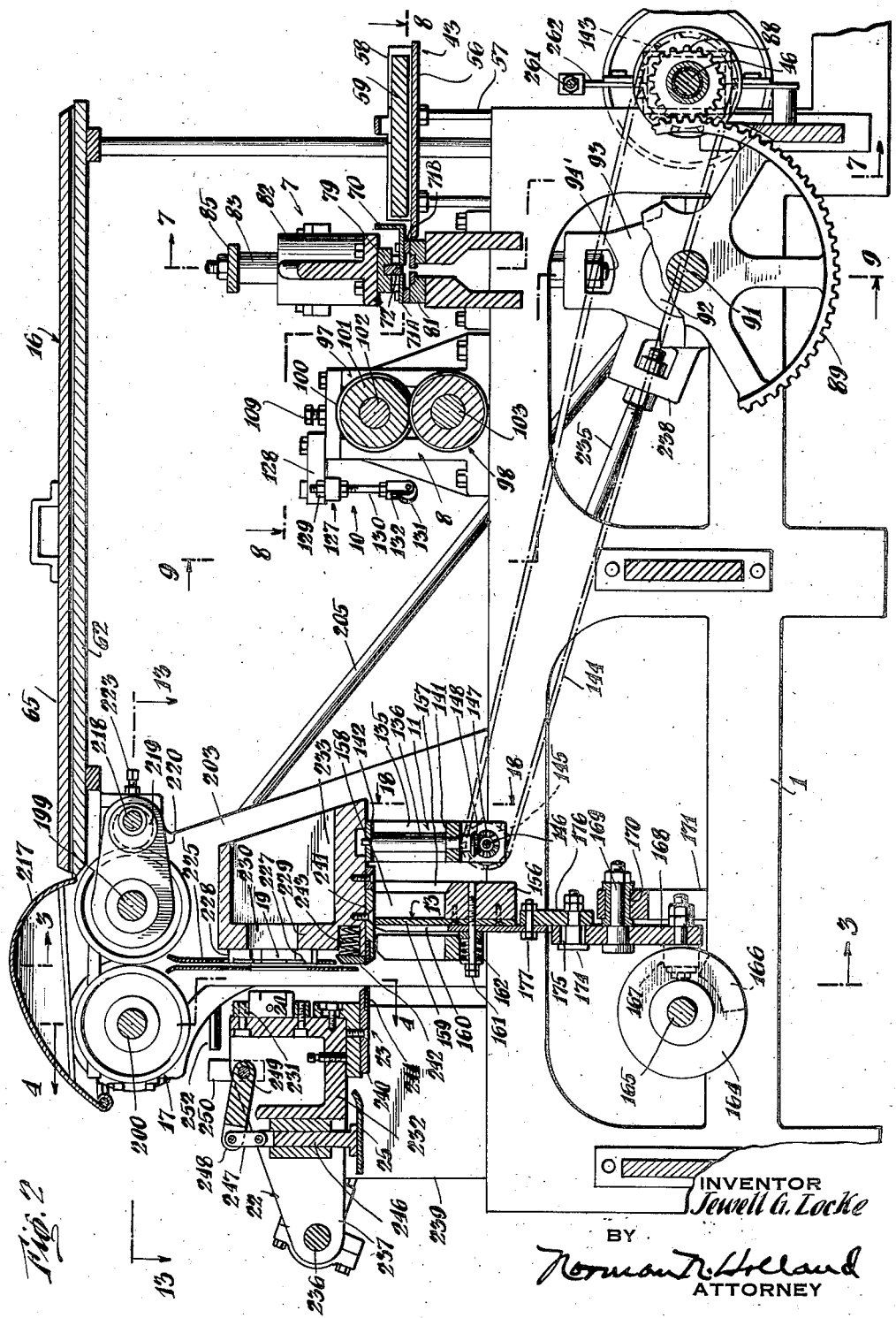

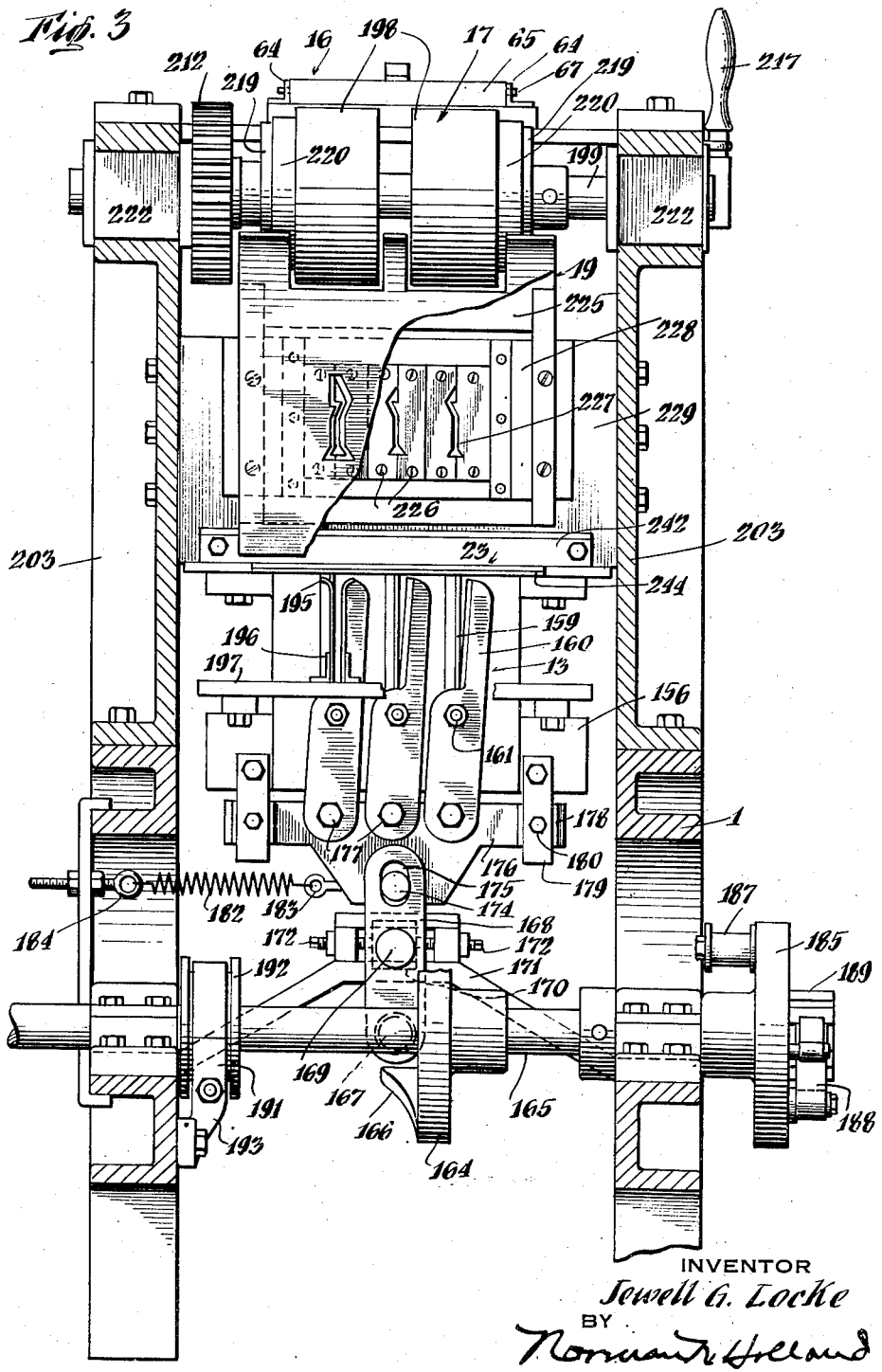

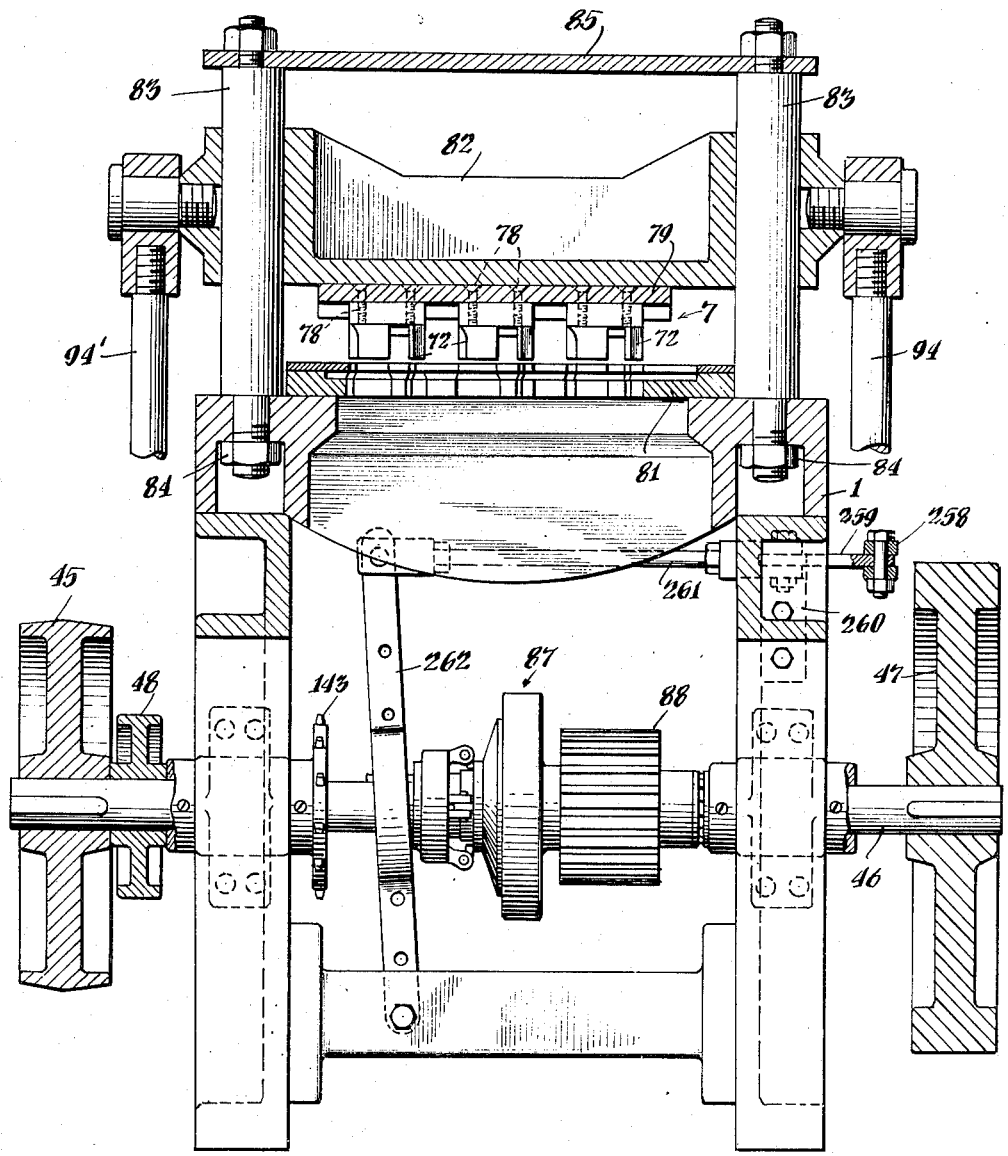

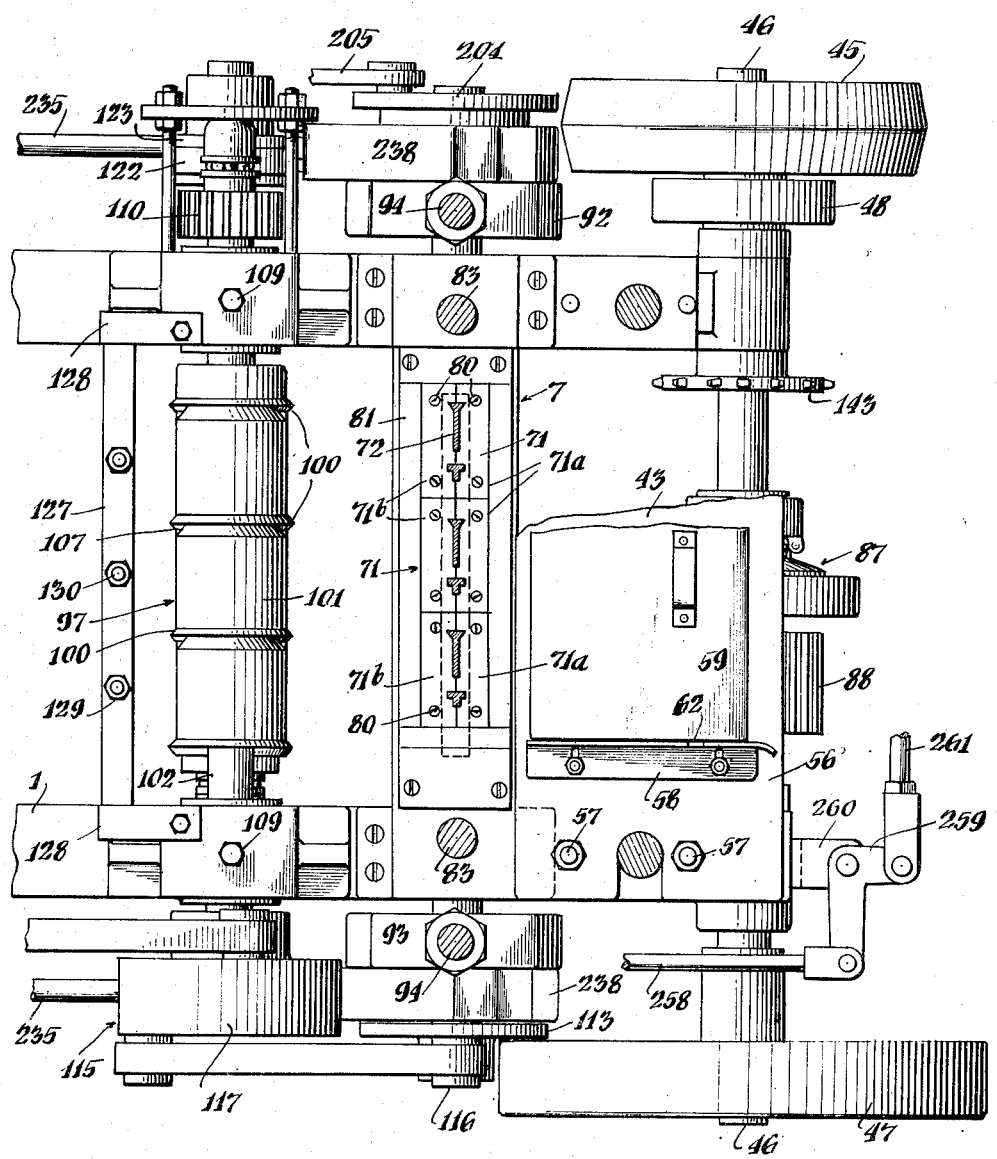

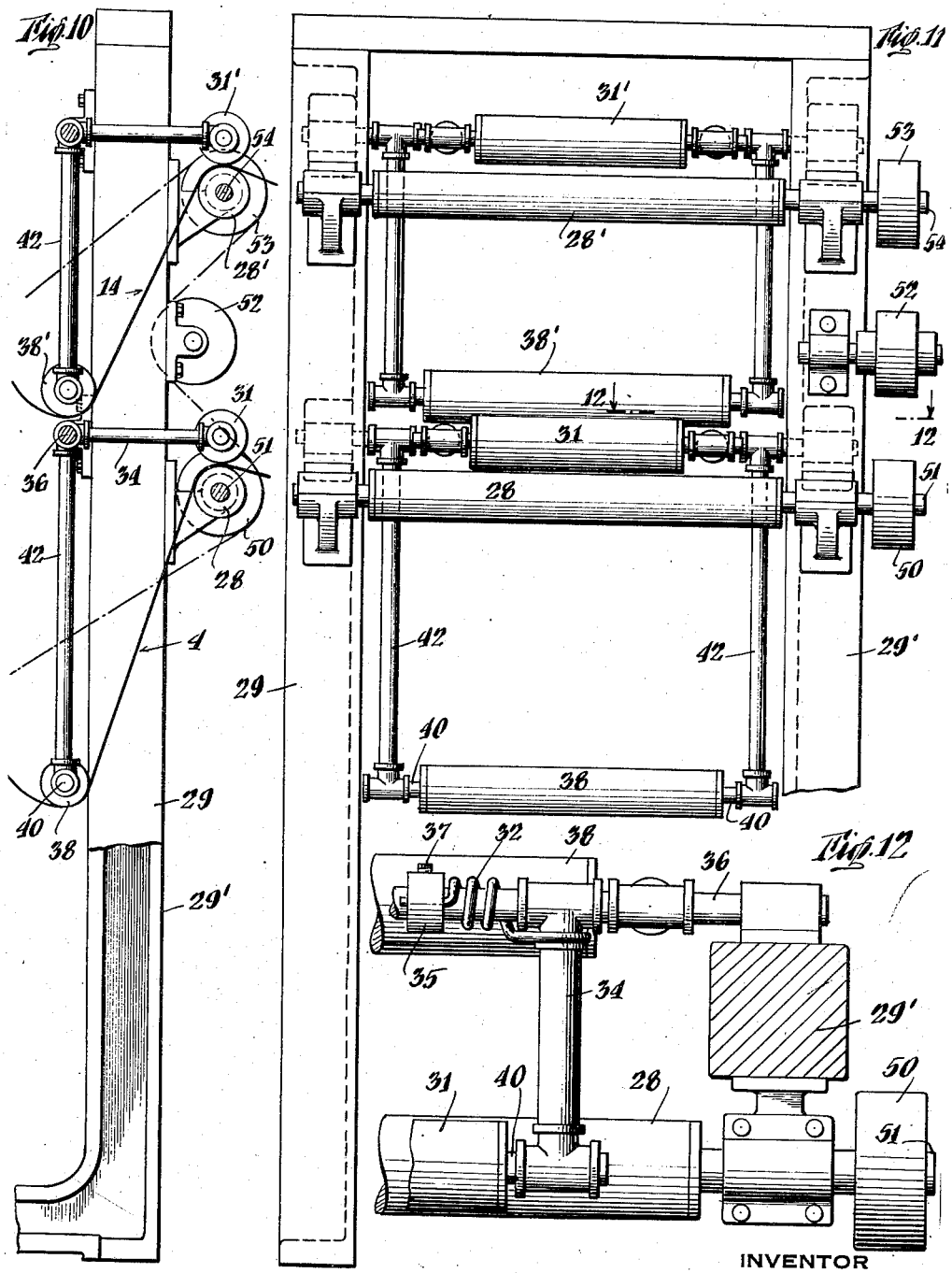

Aug. 14, 1951  J. G. LOCKE  2,563,947
MACHINE FOR MANUFACTURING AND ASSEMBLING
FILLER PARTITIONS
Filed Aug. 28, 1946  12 Sheets-Sheet 9
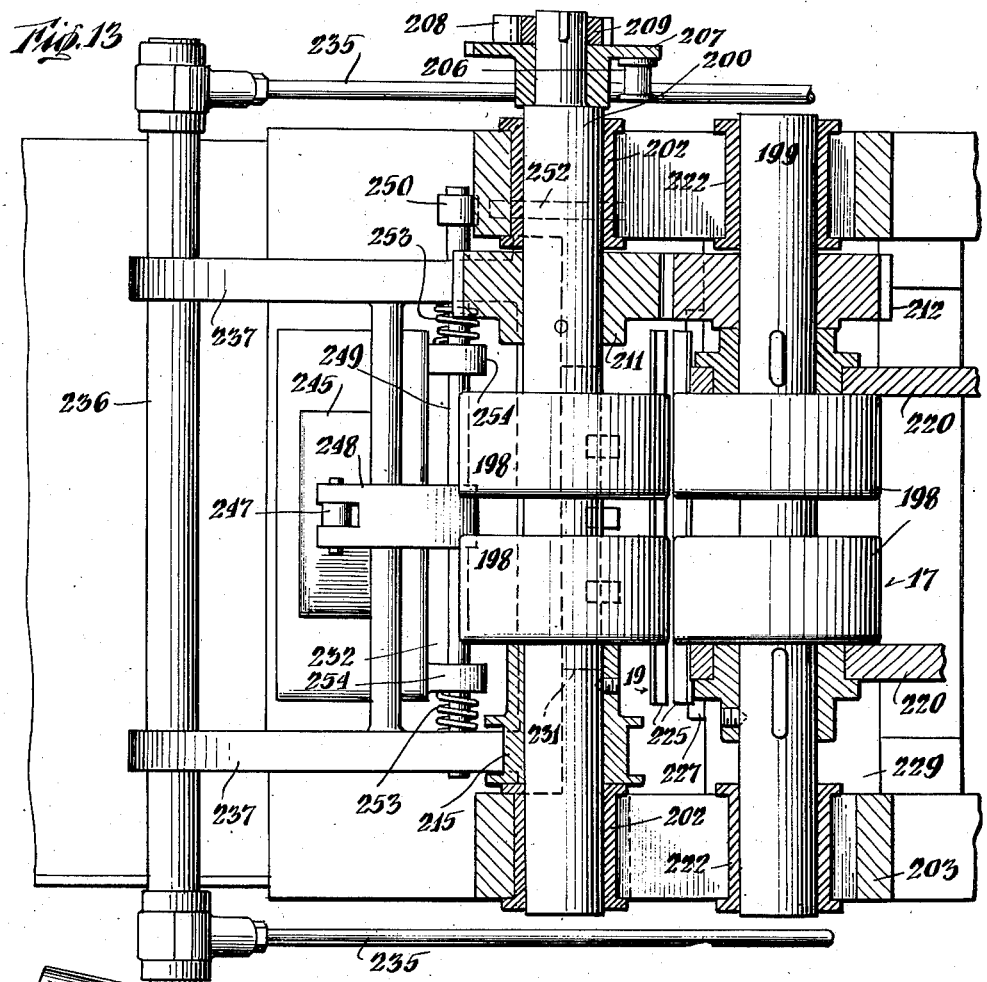
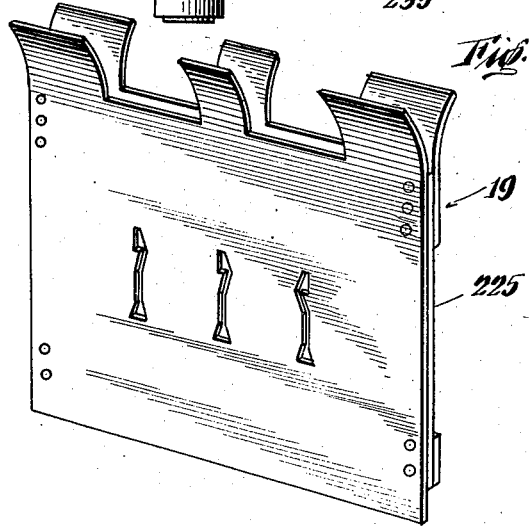
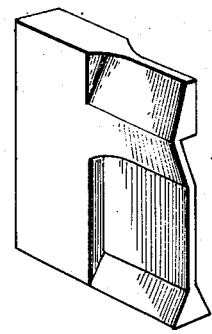
INVENTOR
Jewell G. Locke
BY
ATTORNEY Aug. 14, 1951 J. G. LOCKE 2,563,947
MACHINE FOR MANUFACTURING AND ASSEMBLING
FILLER PARTITIONS
Filed Aug. 28, 1946

INVENTOR
Jewell G. Locke
BY
Norman K. Holland
ATTORNEY

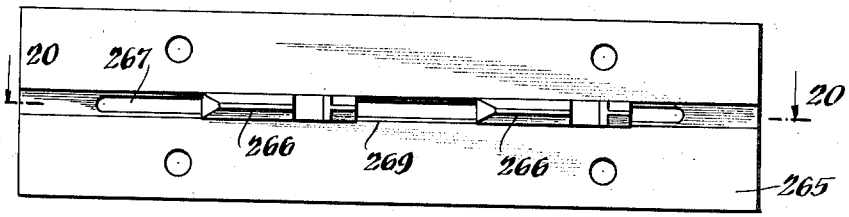
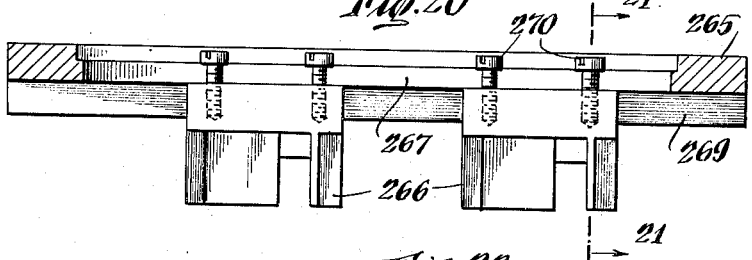
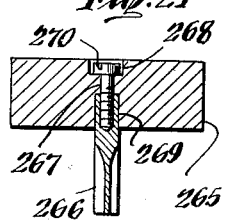
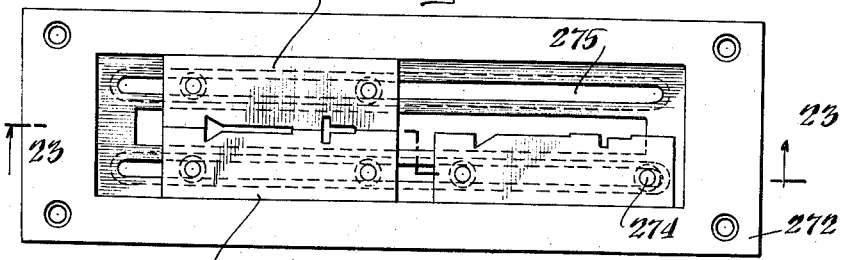
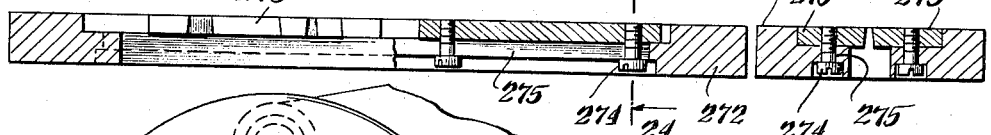
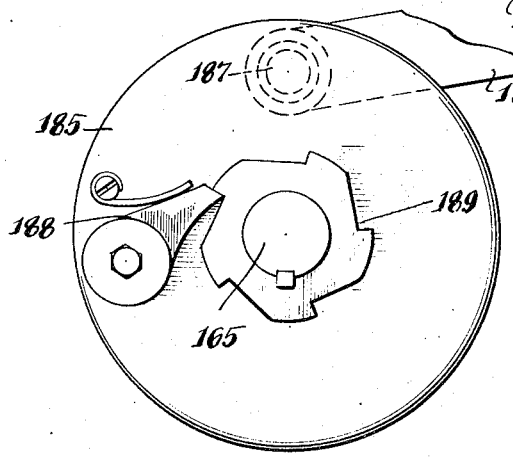
INVENTOR
Jewell G. Locke
BY
Norman A. Holland
ATTORNEY

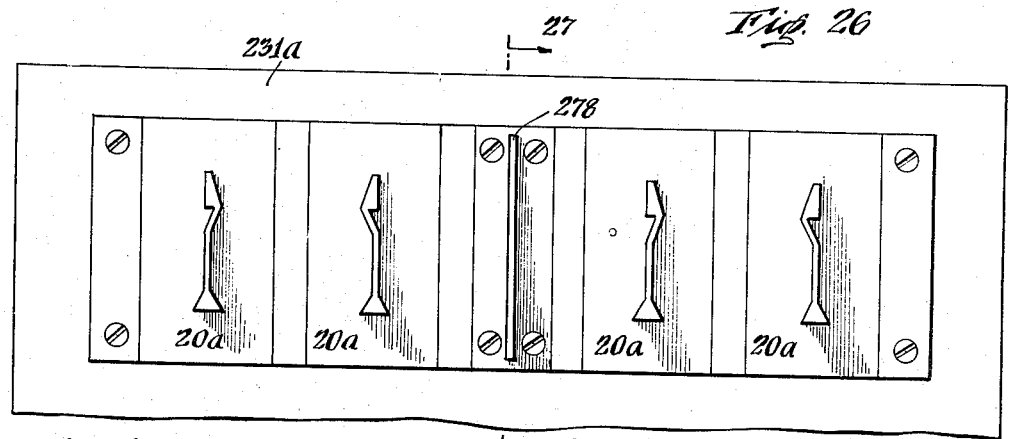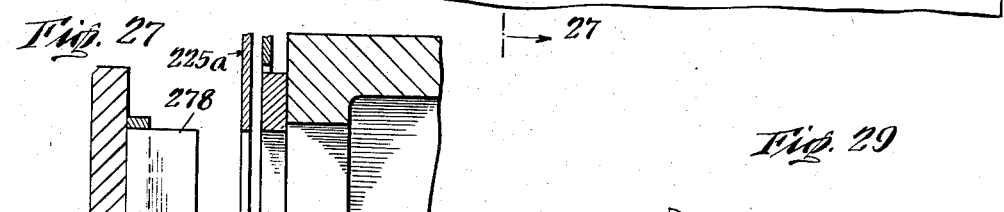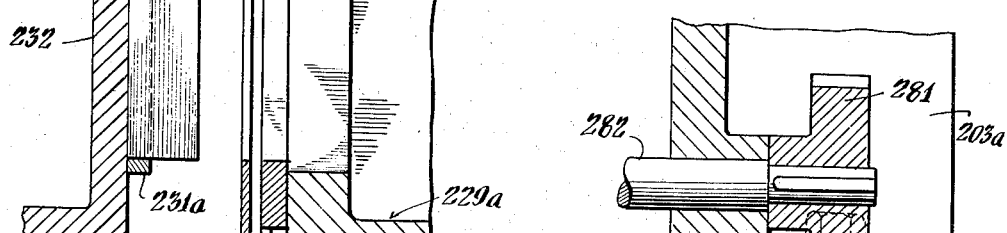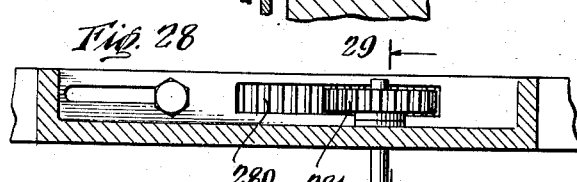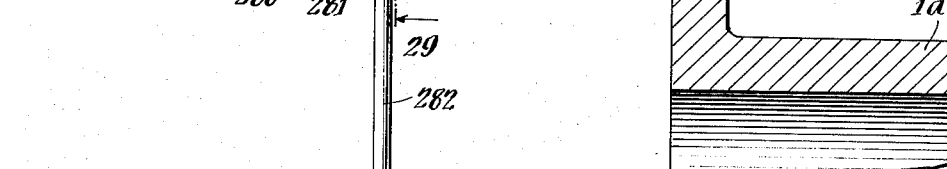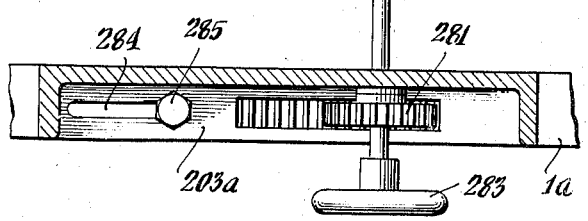

Patented Aug. 14, 1951

2,563,947

UNITED STATES PATENT OFFICE 2,563,947

MACHINE FOR MANUFACTURING AND ASSEMBLING FILLER PARTITIONS

Jewell G. Locke, Lancaster, Ohio, assignor to Anchor Hocking Glass Corporation, Lancaster, Ohio, a corporation of Delaware Application August 28, 1946, Serial No. 693,500

6 Claims. (Cl. 164—60)

The present invention relates to a new and improved machine for making fillers for use in boxes or cartons to maintain articles separated from each other.

In the glass container industry, it is customary to pack and ship a dozen or more glass articles at a time in a single carton or box. Due to the fragile nature of these articles, it is desirable that each glass container be maintained out of contact with other containers and that it be prevented from shifting about in the box during shipment. The separation of such fragile articles is generally achieved by first inserting into the carton or box a "filler" unit made up of intersecting cardboard or corrugated paper board partitions; the intersecting partitions form separate divisions or cells adapted to receive the articles and maintain them separated from each other. In some instances fillers have been made and assembled by hand, which is time-consuming and expensive. In other instances machines have been devised to manufacture and assemble the partitions, but such machines have presented various objections. The present machine is adapted to manufacture and assemble partitions into filler units and embodies various improvements over previous machines.

An object of the present invention is to provide a new and improved machine for manufacturing filler units.

Another object of the present invention is to provide a machine of the class described embodying a new and improved paper web feeding mechanism.

Another object of the present invention is to provide a filler making machine embodying new and improved control means.

Another object of the present invention is to provide a new and improved strip adjusting means.

Another object of the present invention is to provide an improved partition seating mechanism.

Still another object of the present invention is to provide a partition making machine having greater flexibility with respect to the size or type or filler units which may be manufactured on the machine.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a side elevational view of the present machine;

Fig. 2 is a longitudinal sectional view of the machine illustrated in Fig. 1;

Fig. 3 is a sectional view taken along the line 3—3 of Fig. 2;

Fig. 4 is a sectional view taken along the line 4—4 of Fig. 2;

Fig. 5 is an exploded fragmentary perspective view showing details of two filler partitions;

Fig. 6 is a perspective view of one form of filler unit assembled for use in a carton;

Fig. 7 is a sectional view along the line 7—7 of Fig. 2;

Fig. 8 is a sectional view along the line 8—8 of Fig. 2;

Fig. 10 is a side elevational view, partly broken away, of a web feeding means illustrated in Fig. 1;

Fig. 11 is a front view of the web feeding means illustrated in Fig. 10;

Fig. 12 is a sectional view taken along the line 12—12 of Fig. 11;

Fig. 13 is a sectional view along the line 13—13 of Fig. 2;

Fig. 14 is a perspective view of a web guiding and stripping means;

Fig. 15 is a perspective view of one form of punch;

Fig. 19 is a top plan view of a modified form of punch holding means;

Fig. 20 is a sectional view taken along the line 20—20 of Fig. 19;

Fig. 21 is a sectional view taken along the line 21—21 of Fig. 20;

Fig. 22 is a top plan view illustrating a modified form of die holding means;

Fig. 23 is a sectional view taken along the line 23—23 of Fig. 22;

Fig. 24 is a sectional view taken along the line 24—24 of Fig. 23;

Fig. 25 is an enlarged side elevational view illustrating a ratchet and pawl mechanism shown in Figs. 1 and 3;

Fig. 26 is a fragmentary plan view of a modified form of the invention;

Fig. 27 is a sectional view taken along the line 27—27 of Fig. 26;

Fig. 28 is a fragmentary plan view showing a modified form of adjusting means; and Fig. 29 is a fragmentary sectional view taken along the line 29—29 of Fig. 28.

Figure 9:
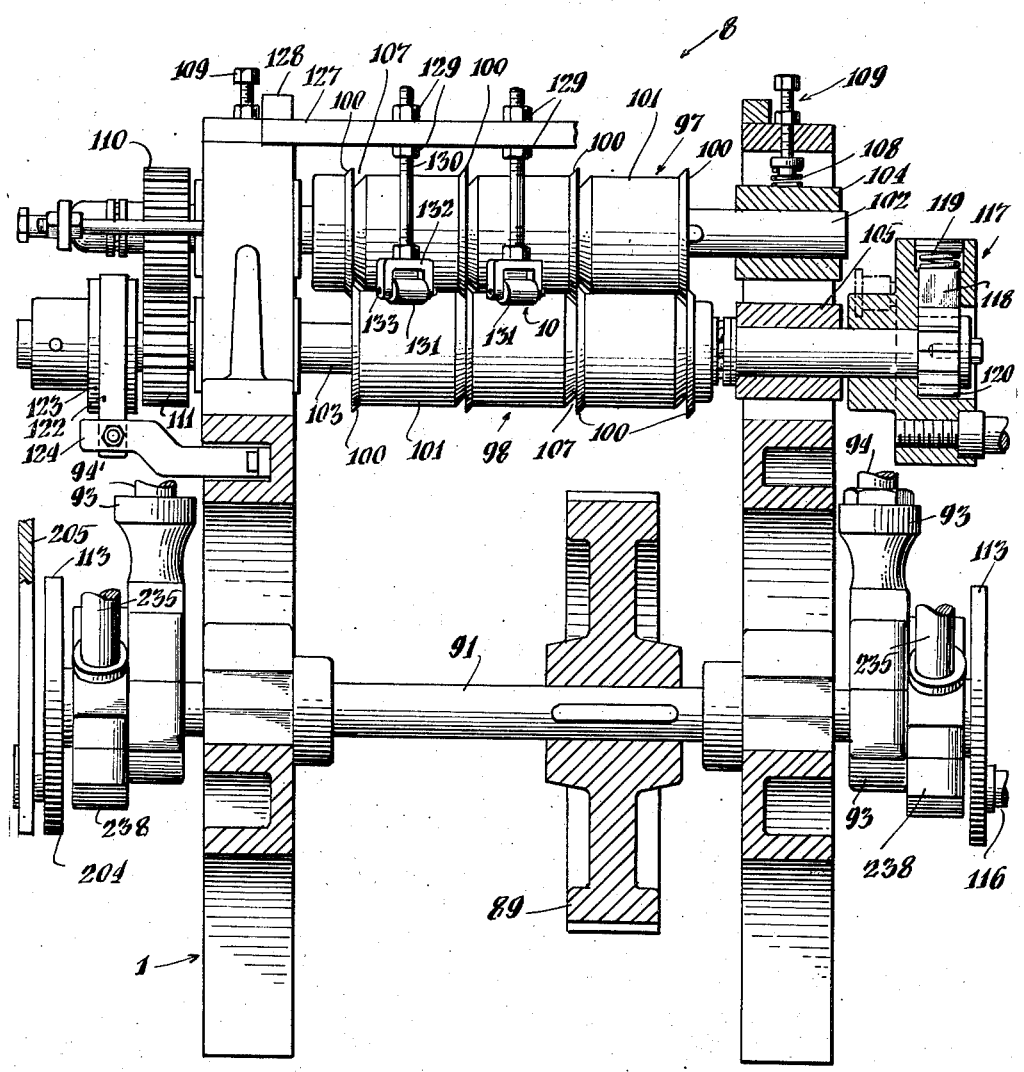
Fig. 9 is a sectional view along the line 9—9 of Fig. 2.
Figure 16:
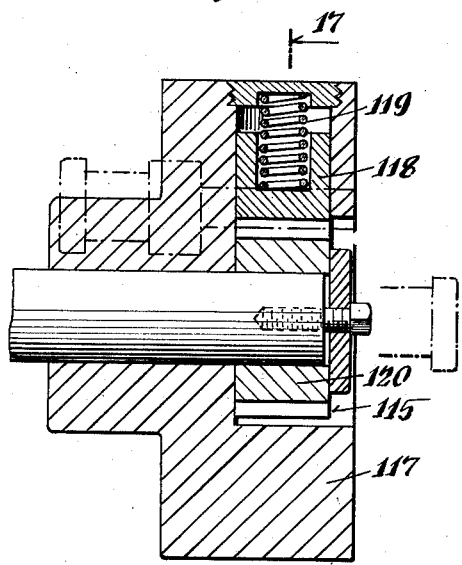
Fig. 16 is an enlarged sectional view illustrating a slitter roller ratchet and pawl shown in Figs. 1, 8 and 9.

A preferred embodiment of the machine will be described under the following headings (1) General description, (2) Web feeding mechanism (3) Punching of longitudinal web, (4) Slitting of longitudinal web, (5) Guiding of longitudinal strips, (6) Erection of longitudinal strips, (7) Shearing of longitudinal strips, (8) Feeding of web for transverse partitions, (9) Punching of transverse web, (10) Shearing of transverse web, (11) Seating of transverse partitions, (12) Control mechanism, (13) Modified web punching means, (14) Modified shearing of transverse web.

General description

Described generally, the present machine comprises a frame or base 1 supporting the various mechanisms that remove paper webs from rolls and guide, punch, slit, transfer, shear and form the webs into partitions and finally assemble the partitions into complete filler units (Fig. 6) which may be placed into cartons or stored for future use.

Paper for forming the various partitions or walls of a filler unit is received in relatively large rolls (not shown). The rolls are preferably mounted upon an axle or bar and the bar thereafter supported on horizontally disposed friction-reducing means so that a web of paper may be unrolled as required by the machine. Two rolls are used simultaneously in the manufacture of the filler units, one roll providing the material for one set of partitions 1 (Fig. 6) and the other roll providing the material for a second set of partitions 2 (Fig. 6) which intersect the first set at an angle.

The paper web 4 from one roll (not shown) passes through the feeding device 5 shown at the right of Fig. 1, thence through a punch and die mechanism 7 for forming appropriate apertures in the web, next between slitter rolls 8 which cut the web into strips of desired width, thereafter beneath adjusting means or fingers 10 which control the movement and path of the strips out of the slitter rolls 7, between vertically disposed feed rollers 11 which are effective to turn or erect the strips to an on-edge position, and finally through a shearing mechanism 13, which is actuated at intervals to cut off the strips at the correct length.

The paper web 14 from the second roll (not shown) passes through the upper feed rollers of the feeding device 5 shown at the right of Fig. 1, thence along the guide 16, downwardly between the feed rollers or wheel 17 shown at the upper part of the upright or vertical members at the left of the machine, and downwardly through the guide and stripper plate 19 where it is appropriately perforated by the horizontally reciprocating puncher 20.

Downwardly moving partitions formed from the web 14 are adapted to fit into cutouts or apertures formed in the previously mentioned strips or partitions formed from the web 4 and which move through the lower part of the machine.

For purposes of convenience, the strips or partitions formed from the web 4 by the lower part of the machine will be referred to as the "longitudinal" partitions or strips and those formed from the web 14 and fitted into notches and grooves in the lower partitions will be referred to as the "transverse" partitions and strips.

The puncher 20 shown at the left side of the vertical members is carried by a head 22 which also supports a blade or knife 23 that is adapted to shear or cut off the web 14 to form transverse partitions 3 after the end of the web has been fitted into complementary grooves in the longitudinal partitions 2. The longitudinal strips advance in step by step relationship and the transverse strips are fitted into the complementary slits at appropriate intervals. When a predetermined length of longitudinal partition has passed through the machine, the shearing mechanism 13 is operated to cut off the longitudinal strips into partitions, succeeding strips push a completed filler unit forwardly beneath a tamping device 25 which is adapted to firmly seat the transverse partitions in the grooves or slits of the longitudinal partitions.

Completed filler units move outwardly onto a catch table 26 from which they may be removed for use in cartons or stored for future use.

The foregoing general description will now be amplified by detailed descriptions of each of the various means or mechanisms which cooperate to form filler units.

Web feeding mechanism

The feeding mechanism illustrated at the right of Fig. 1 and in Figs. 10, 11 and 12 is adapted to pull webs or lengths of paper from large rolls and to form slack loops thereof immediately in advance of entry of the webs into those parts of the machine which perform stamping and slitting operations; the large rolls of paper possess considerable inertia and feeding a web directly from such a roll into the machine presents objections, such as tearing of the paper. The slack loops formed by the feeding mechanism act as reservoirs from which lengths of paper may be drawn without tearing thereof.

A paper web 4 which forms the longitudinal partition passes from one roll of paper (not shown) over a lower driven feed roller 28 carried by the spaced uprights 29, 29' and is maintained in contact with the lower feed roller by an upper roller 31, which rides against the upper surface of the web 4 and is urged downwardly into contact therewith by spaced resilient spring means 32 looped around supporting arms 34 of the upper contacting roller at one end and connected at their other ends with collars 35 fixedly secured to a supporting shaft 36 by set screws 37. The arms 34 are pinned to the shaft 36, the shaft 36 is supported by brackets or bearings fixed to the spaced uprights 29, 29'. A third roller 38, mounted on a shaft 40 which is rigidly connected by side arms 42 with the shaft 36, and through the latter with the upper contacting roller 31, is positioned beyond the feed rollers 28, 31 and is effective to guide the web 4 of paper into a loosely hanging loop between the roller 38 and its entry into a trough or guideway 43 of the machine.

The means for feeding a second web 14 of paper from a second roll is shown at the upper part of the spaced standards 29 and 29' of the paper feeding mechanism 5 and is constructed and operates in a manner similar to that described for feeding the lower web 4.

Both sets of web feeding rollers are driven by an electric motor and belt (not shown) through a pulley wheel 45 (Fig. 7) keyed to the drive shaft 46, a second pulley wheel 48 also keyed to this shaft 46, and a drive belt 49. The drive belt 49 passes over the surface of a pulley 50 keyed to the driving shaft 51 of the lower set of web feeding rollers, thence beneath an idler pulley 52 and over a pulley 53 keyed to the shaft 54 of the upper driving roller for the upper or transverse web 14 of paper. A flywheel 47 keyed to the shaft 46 "smooths out" the operation of the machine in the usual manner.

The paper feeding device is effective to pull webs of paper from the two rolls thereof and to form it into slack loops immediately prior to entry of the webs into the cutting and stamping parts of the machine. The driven rollers 28, 28' of the paper feeding device are rotated continually as long as the pulley 45 and drive shaft 46 are rotated, and thus serve to supply the paper continuously to the webs 4 and 14 for forming longitudinal and transverse partitions.

The lower web 4 for forming longitudinal partitions passes from its loop over a plate 56 supported on legs 57 and between spaced side flanges 58 which form the guideway or trough 43 for directing the paper accurately to horizontal punches and dies 7. The paper may be held down against the surface of the plate 56 by a board 59 which rests in the channel between the spaced angle members or flanges 58; a white pine board has proven satisfactory for this purpose and it is preferably provided at opposite sides with outwardly projecting pins 61 adapted to extend through inclined slots 62 in such manner as to maintain the board spaced slightly from the surface of the plate member 56.

Paper from the web 14 which is adapted to be formed into transverse partitions 3 (Fig. 6) passes through an elevated trough 16 formed by a bottom plate 62 and spaced angles 64. A second white pine board 65 may be provided for maintaining the web 14 in position at the bottom of the trough during movement thereof toward feed rollers 17 and it may have outwardly projecting pins 67 at opposite sides thereof adapted to fit into inclined slots 68 to thereby minimize movement of the board with the web passing beneath it.

Punching of longitudinal web

From the lower guide trough 43 the lower web 4 of paper passes beneath a stripper plate 70 and over the surface of dies 71 (Figs. 2, 7 and 8). At appropriate intervals reciprocable punches 72 move downwardly through openings in the stripper plate 70 and the dies 71 to form perforations in the web of cardboard. The openings formed in the longitudinal web are shown at 73 and 74 in Fig. 5 and comprise, respectively, a slit adapted to receive a transverse partition and a T-shaped opening adapted to cooperate with a locking tab or projection 75 on a transverse partition to secure the two partitions in assembled relationship; it is to be understood that the shape or form of the particular perforations or slits formed in the webs may be varied as desired by utilizing suitable punches and dies at the perforating stations of the machine. The stripper plate serves to hold the web 4 in downward position during retraction of the punches 72 from the dies and the web. As shown in Figs. 7 and 8, three sets of complementary punches and dies are shown at this station of the machine, but it is to be understood that the number may be varied as desired.

The punches 72 are shown in Fig. 7 secured by bolts 78 to a frame or retraining member 79. The dies illustrated in Figs. 7 and 8 comprise complementary halves 71A and 71B secured by bolts 80 to a frame or retaining member 81. Additional frames or retaining members, having assembled therewith greater or lesser numbers of dies and punches, may be retained in readiness for assembly into the machine when it is desired to form partitions having greater or lesser numbers of openings or of different widths.

The retaining frame 79 for the punches 72 is secured to a cross bar or punch head 82 which is fitted over spaced vertically positioned shafts 83 secured to the frame 1 of the machine by nuts 84 and maintained in correctly spaced relationship at their upper parts by a cross bar 85. Vertical reciprocation of the punch head 82 with the punches 72 is achieved by the previously mentioned motor and belt (not shown) through the intermediation of pulley 45, shaft 46, clutch 87, pinion gear 88, gear 89 keyed to shaft 91, eccentrics 92 keyed to the shaft 91, yokes 93 extending around the eccentrics 92, and spaced vertical shafts 94 and 94'. The punches 72 thus reciprocate continuously as long as the clutch 87 is operative to engage the pinion gear 88 with the drive shaft 46. Preferably a raw-hide type pinion 88 is utilized to facilitate quiet operation of the pinion with the mating gear 89.

Pieces punched out of the web 4 by the reciprocating punches 72 drop through the dies 71 and the framework of the machine which supports the die-retaining means 81 and fall to the floor or into a chute, from which they may be periodically removed.

Punching the apertures into the web 4 prior to slitting the web into separate partition strips insures accurate positioning of the apertures in the partitions.

From the above-described punch and die station 7 the web 4 passes to the slitter station 8, where the web is cut into partition strips of appropriate width or height.

Slitting of longitudinal web

The web of paper, cardboard, or other material which is fed through the punch and die station 7 is preferably sufficiently wide to form several partitions and the purpose of the slitters at the slitting station 8 is to sever the web into an appropriate number of strips and to do this along definite lines so that the perforations formed in the previous punching operation will be correctly positioned to receive transverse partitions (Fig. 5).

The slitting operation is achieved by passing the web 4 between upper and lower slitter rollers 97 and 98 comprised of knives or cutter discs 100 and spacers 101 mounted on shafts 102 and 103 respectively. The shafts are supported in bearings 104 and 105 retained in position at opposite sides of the frame 1 of the machine (Figs. 2, 8 and 9). The spacers 101 serve to accurately position the circular knives 100 of the slitter rollers which cooperate with each other to slit a web into strips. It will be noted that a knife or cutter of one roller fits into a space or groove 107 on the complementary roller; the knives overlap each other and insure complete severance of a web 4 along a definite line.

The upper slitter roller 97 may be maintained in tangential relationship with the lower roller 98 by springs 108, the resiliency of which may be varied by an adjustable nut and bolt construction 109 secured to the upper part of the frame of the machine.

The upper roller 97 is operatively connected with and driven by the lower roller 98 through intermeshing gears 110 and 111 secured to the respective roller shafts 102 and 103. The lower roller 98 is rotated by the same shaft 91 which actuates the punches at the punch and die station 7 previously described, through the intermediation of a disc 113 keyed to shaft 91, connecting rod 114 secured at one end to the disc 113 and cooperating ratchet and pawl 115 operatively connected with the shaft 103 of the lower slitter roller. As the disc 113 revolves with the shaft 91, it carries with it the lower end of connecting rod 114 which is connected to a bearing or pin 116 bolted to the disc. The upper end of the connecting rod 114 is rotatably pinned or connected to an oscillatable disc 117 (Fig. 17) rotatably mounted on the shaft 103 of the lower slitter roller 98. This latter disc 117 has mounted therein a pawl member 118 which is urged downwardly by a pawl spring 119 and cooperates with a ratchet member 120 keyed to the shaft 103; the construction is such as to achieve step by step movement of the lower slitter roller 98 in one direction. As the shaft 91 rotates and carries the lower end of the connecting rod 114 around with it, the upper end of this rod serves to oscillate the disc 117 and causes the pawl 118 mounted therein to slip over the teeth of the ratchet 120 when moved in a clockwise direction and to rotate the ratchet and shaft 103 with it when moved in a counter-clockwise direction. The size of the ratchet 120 and the number of teeth or steps thereon will depend upon the desired advance of the lower slitter roller 98 and the distance which it is desired to feed the web 4 or strips through the machine between the upper and lower slitter rollers. In the present instance five steps are shown on the ratchet 120 as such has proven satisfactory in actual operation of the machine. It will be noted that one of these ratchet steps is of considerably greater circumferential length than the others and the purpose of this is to advance the web 4 or strips through the machine a greater distance in connection with a shearing operation which will be hereinafter described.

Both the slitter rollers 97 and 98 and the punches 72 at the preceding station are actuated from the same drive shaft 91 and the timing of the operations at each station is such that the punches perforate the web 4 at the correct instant and while the web is stationary.

Excessive movement of the slitter rollers, due to inertia, beyond the actual advance achieved by the pawl and ratchet movement may be prevented by a brake band 122 which passes around a cylindrical member 123 secured to the shaft 103 and is retained in clamping relationship by an arm 124 secured to the frame 1 of the machine.

Guiding of longitudinal strips

The paper web and strips pass through the slitter rollers in horizontal position and in connection with a succeeding operation to be later described, it is desirable that the several strips formed by the severing operation of the slitter rollers be turned to an erect or on-edge position; this is achieved by the feed rollers shown at the left of Fig. 2 and in Fig. 18.

In order to achieve most satisfactory operation of the slitter rollers 97 and 98, it is desirable that the web and strips be maintained in contact with the lower roller 98 for a distance beyond the point of tangency of the upper and lower rollers. Maintaining the strips thus in contact for a slight circumferential distance beyond the point of tangency provides an improved feed of paper between the rollers, minimizes a tendency to excessively twist or tear the strips and insures cleaner lines of severance by the knives 100 of the rollers.

The desirable contact of the strips with the rollers 97 and 98 may be achieved by utilizing the strip adjustment fingers 10 supported on a cross bar 127 held in position by arms 128 bolted to the upper part of the machine frame in which are mounted the slitter rollers. The adjustment fingers 10 are vertically adjustable by appropriate rotation of the nuts 129 secured to threaded portions of the shaft 130 of an adjustment finger. Rollers 131 mounted in yokes 132 by pins 133 are adapted to contact the upper surface of the strips which emerge from the rollers 97 and 98. The lower edges of the rollers 131 are preferably positioned below the point of tangency of the upper and lower rollers 97 and 98 and the paper strips emerging from the rollers pass downwardly beneath the small rollers 131 of the adjustment fingers 10 and in this manner are obliged to travel for a short distance in contact with the surface of the lower slitter and feed roller 98.

Figure 18:
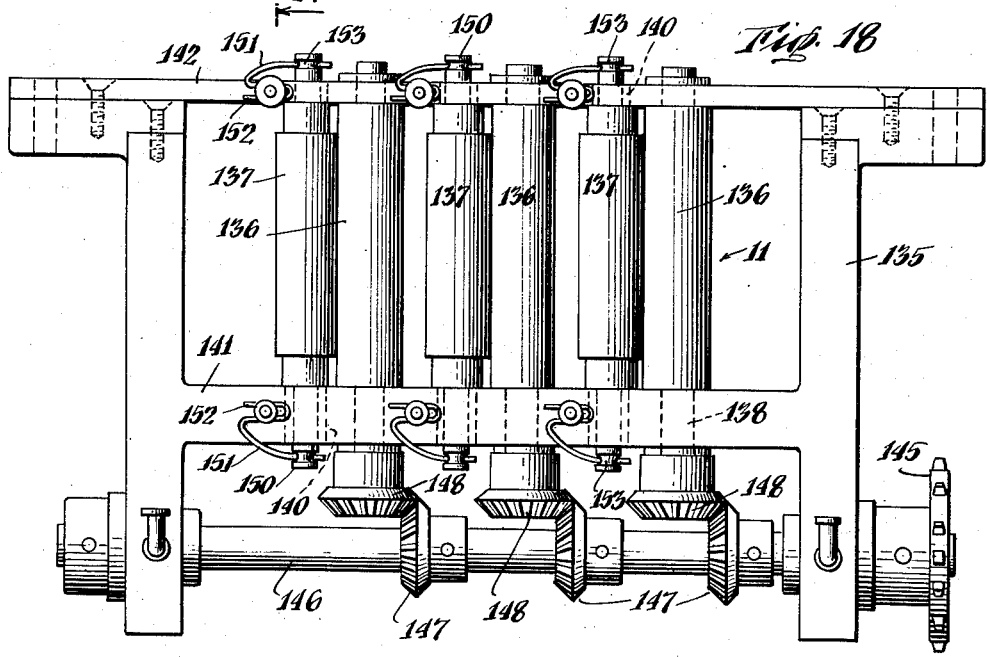
Fig. 18 is a sectional view taken along the line 18—18 of Fig. 2.

Preferably the adjustment rollers 131 are turned slightly so that their longitudinal axes form an angle with the longitudinal axes of the slitter and feed rollers 97 and 98; this feature facilitates a smooth, even feed of the strips and a "gentle" twisting or warping intermediate the transfer from the horizontal web position at the slitter and feed rollers to the erect position of the vertically disposed rollers illustrated at the left of Fig. 2 and in Fig. 18.

Erection of longitudinal strips

The longitudinal partitions formed by slitting the web 4 are turned to substantially erect or vertical position by pairs of cooperating rollers illustrated adjacent the left of the machine in Fig. 2 and in Fig. 18. This erect position facilitates assembly with transverse partitions at a subsequent station of the machine. As shown in Fig. 18, there are three sets or pairs of these rollers, but the number may be varied in accordance with the number of longitudinal partitions utilized in manufacturing a particular filler.

The mechanism for turning the strips on edge comprises a roller mounting frame 135 having rollers 136 and 137 operatively assembled into apertures 138 and 140 in a lower cross bar 141 and in a top plate 142 of the frame. The top plate 142 may be secured by bolts or screws to the upper part of the frame 135. One of the rollers 136 of each pair has a shaft or axle thereof extending through the apertures 138 and is driven by a sprocket 143 pinned to the main drive shaft 46 through the intermediation of sprocket chain 144, sprocket 145 pinned to the shaft 146, bevel gear 147 pinned to the shaft 146, and intermeshing bevel gear 148.

The shafts 150 of the rollers 137 which cooperate with the driven rollers 136, extend through bushings mounted in the slots or enlarged apertures 140, and these latter rollers 137 are urged into contact with the driven rollers 136 by resilient spring means 151 secured adjacent one end 152 thereof to the frame 135 and top plate 142 and extending about grooves 153 in the shaft adjacent the other ends thereof. A strip of paper or cardboard for forming a longitudinal partition passes between the driven roller 136 and the contacting roller 137. The driving roller 136 is rotated continuously but at periods when the feed rollers 8 are not rotating to move the web 4 forwardly through the machine, the vertical driving roller 136 slips against a longitudinal partition; that is, the pairs of cooperating vertical rollers tend to continually pull strips through the machine but actual movement of the web and strips is controlled by the horizontally disposed slitter and feed rollers at a preceding station 8 which operate in step by step movement.

Preferably the contacting surfaces of the rollers 136 and 137 are of case-hardened metal. Partition strips passing through the various pairs of rollers are all advanced equal distances due to the fact that the same drive shaft 146 operates each of the driven rollers.

As the strips leave the vertical feed rollers, the aligned slots and notches therein are adapted to receive transverse partitions which cooperate with the notches to form a filler unit.

*Shearing of longitudinal strips*

From the vertical feed rollers 136 and 137 the partition strips move through a shearing mechanism (Figs. 2 and 3) which is adapted to sever the strips at the correct instant to provide longitudinal partitions of correct length. The length of the partitions is dependent upon the size of the filler unit, which is in turn dependent upon the size of the particular carton or box into which the filler unit is to be inserted.

The shearing mechanism comprises a shear holder block 156 having a V-shaped entry groove 157 at one side thereof communicating with a narrow guide slot 158 adapted to receive the strips from the vertical feed rollers and conduct them between the jaws of back shear blades 159 and front shear blades 160. The back shear blades 159 are bolted in fixed position to the exit side of the shear holder block 156 and the front shear blades 160 are pivotally connected with the shear holder block by pivot bolts 161 so that they may be moved in scissor-like fashion to cut off the partitions at the correct instant. A spring 162 extending about the pivot bolts 161 is adapted to urge the front shear blades into close contact with the back shear blades. The number of pairs of shear blades will depend upon the number of partitions passing through the machine, and for illustrative purposes three pairs are shown in Figs. 2 and 3.

Pivotal movement of the front shear blades to cut off partition strips is achieved by rotation of a shear cam wheel 164 mounted on and keyed to a shaft 165. Rotation of the shaft 165 and cam wheel 164 moves the cam 166 into periodic contact with a roller 167 secured to one end of a shear arm 168 which is pivotally connected by 169 to an adjustable shear block 170 carried on a shear arm bridge 171; the shear block 170 may be adjusted by turning the set screws 172. A pin 174 extending through an aperture or slot 175 at the upper end of the shear arm 168 connects the latter with the lower part of a shear base 176 and is effective to move the shear base toward the left or right (Fig. 2) as the cam 166 moves the lower end of the shear arm 168. The lower ends of the front shear blades 160 are pivotally connected by bolts 177 with the shear base 176 and are thus operated in scissor-like fashion by pivoting about the bolts 161.

Preferably the shear base 176 is supported in brass adjustment guides or blocks 178, retained in position within substantially U-shaped supporting members or hangers 179 by set screws 180. This construction facilitates free movement of the shear base 176 toward the left or right. A spring 182 connected by an eyebolt 183 with the shear base 176 and at its opposite end to an eyebolt 184 at one side of the machine is adapted to pull the shear base and the front shear blades to inoperative or open position after the roller 167 has passed beyond the operating surface of the cam 166.

Figure 17:
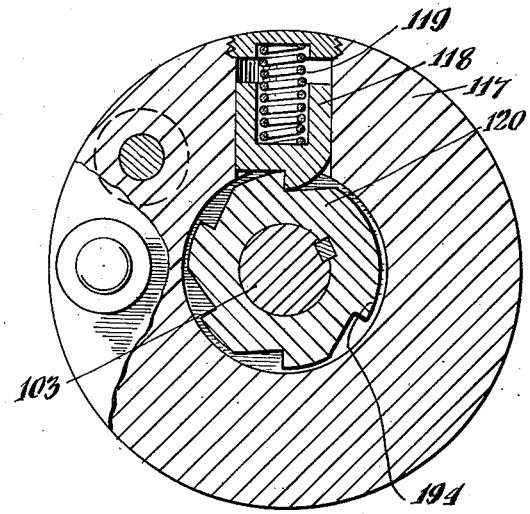
Fig. 17 is a sectional view taken along the line 17—17 of Fig. 16.

It is desirable that the shear operating shaft 165 be actuated in timed relationship with movement of partition strips through the machine. This is obtained by a pawl-carrying disc 185 oscillatably mounted adjacent one end of the shaft 165, the disc 185 being rocked or oscillated in to and fro motion about the axis of shaft 165 by a connecting rod 186 connected with a pin 187 on the disc 185 and at the other end thereof with an annular pawl-carrying disc 117 of the slitter and feed rollers (Figs. 1 and 17). As the disc 185 oscillates to and fro, it actuates the shaft 165 through the intermediation of the pawl 188 carried thereon which cooperates with the ratchet 189 mounted on the shear cam shaft 165. Thus the step by step movement of the slitter and feed roller disc 117 effects corresponding movement of the shear cam wheel 164.

Excessive movement of the sheer cam shaft 165 due to inertia is minimized or prevented by a brake band 191 extending about a drum or disc 192 fastened to the shaft 165 and connected at the opposite end 193 thereof with the frame of the machine.

It will be noted (Fig. 6) that there are no slots or notches in the longitudinal filler partitions 2 adjacent the cut-off ends thereof. The slots and notches are desirable only at those portions of the partitions which are adapted to receive and cooperate with complementary notches and projections in the transverse partitions. Elimination of the slots or notches in the longitudinal partitions at points where the partitions are to be cut off by the front and back shear blades 166 and 159 is achieved by providing a single relatively long step 194 on the ratchet 120 which is keyed to the lower slitter and feed roller shaft 103 (Fig. 17). When the pawl 118 cooperates with the ratchet 120 of the lower slitter roller it rotates this roller through a certain number of degrees, depending upon the number and width of teeth provided at the periphery of the ratchet 120. It will be noted that one of the teeth 194 of this ratchet 120 has a relatively long peripheral length, which means that the pawl 118 will slide over the surface of this tooth and upon counter-clockwise motion of the annular pawl disc 117 will pull the ratchet and lower feed roller through a relatively greater arc than is true where the pawl cooperates with the shorter or narrower teeth of the ratchet. During the long forward movement of this step 194 the vertically reciprocating punches 72 at the punch and die station 7 are in an elevated position and a greater length of material moves beneath them than occurs where a tooth of lesser size is engaged by the pawl 118. The punches are elevated by the eccentric 92 which serves to move the actuating shafts 94 and 94'.

The front shear blades connected with the shear operating shaft 165 are effective to cut off vertically disposed partition strips at the instant when the shaft 103 of lower slitter and feed roller has moved approximately one-half the distance of the movement caused by the relatively long tooth 194 of the ratchet 120. Thus it will be seen that the shear blades shown adjacent the outlet end of the machine and feed rollers shown at the station 8 cooperate to provide longitudinal partitions not having slots and notches at their extreme ends.

As the longitudinal partition strips emerge from the space between the shear blades, they enter paper guide 195 secured by angle members 196 to the transverse shear guide bar 197. These guides 195 maintain the longitudinal partitions in alignment with the shears and facilitate the shearing action, in addition to maintaining them in upright position for cooperation with transverse partitions.

As the strips or partitions emerge from the paper guides, the notches and locking recesses in them are adapted to receive transverse partitions moving downwardly vertically from the portion of the machine positioned above the paper guides. The mechanism for forming the transverse partitions will now be described.

Feeding of web for transverse partitions

It is pointed out in connection with the general description that web 14 of paper or cardboard for forming transverse partitions was received from a large roller of paper (not shown) and pulled into the machine by the feed rollers shown at the upper part of the standards 29 at the right of the machine (Fig. 1). This feeding device forms the paper into a slack loop and the web 14 from the slack loop passes upwardly through a guide channel formed by the spaced angle members 64 and the white pine board 65, which serves to maintain the web 14 in flat position during its movement along the bottom member 62 of the web guide.

From this web guide the paper is conducted downwardly between pairs of metal wheels or feed rollers 198 located adjacent the upper part and left side of Fig. 2. The rollers 198 are mounted on and keyed to spaced shafts 199 and 200 which are suported in bearings 202 at the upper part of the spaced supporting side members 203. The drive shaft 200 is rotated in step by step movement by a main drive shaft 91 through the intermediation of disc 204, connecting rod 205, pin 206, disc 207, pawl 208, and ratchet 209 keyed to the shaft 200. The shaft 200 has a gear 211 pinned thereto that meshes with a gear 212 on the shaft 199 to rotate the latter shaft. Undesirable rotation due to inertia of the moving parts is minimized by a brake band 214 (Fig. 4) which extends around a brake wheel 215 pinned to the shaft 200; one end of the brake band 214 is adjustably connected with an arm 216 bolted to the frame of the machine at one side thereof.

A guard 217 preferably extends over the upper portions of the feed rollers to minimize the possibility of injury to the hands of an operator and to prevent foreign objects from falling into the operating parts of the machine.

In order to facilitate initial entry of a web 14 between the pair of feed rolls 198 carried by the shafts 199 and 200, it is desirable that the shafts 199 and 200 be separable from each other. This may be obtained by means of a handle 217 extending through a block 213 and keyed to a shaft 218, the latter extending through and being keyed to eccentrics 219 located at opposite ends of the shaft; projections on the eccentric 219 extend through openings at one end of pull links 220 also located adjacent ends of the shaft 218 and openings at the opposite ends of the pull links 220 fit around bushings through which extends the shaft 199. As shown in Figs. 1 and 2 the feed rolls 198 are close together and handle 217 is in position against the stop pin 221; when the handle 217 is moved to the right it rotates shaft 218 and eccentric 219 keyed thereto and moves the pull links 220 toward the right. Since the pull links 220 are connected at their opposite ends with the shaft 199 this shaft, the feed rolls mounted on it, and the bearing housings 222 are moved slightly to the right to thus separate the feed rollers of shaft 199 from those of shaft 200 and facilitate entry of a web between the rolls. Movement of the block to the right may be limited by a set screw 223 to thus limit separation of the feed rollers 198.

From the feed rollers 198 the web 14 of paper passes downwardly between the spaced sides of a guide member or stripper plate 225 (Figs. 2 and 14).

Punching of transverse web

The combined guiding member and stripper plate 225 conducts the paper web past horizontally reciprocating punches 20, which are projectable through the stripper plate 225 and dies 227, to thereby form perforations in the web. The perforations formed in this web 14 are of such nature as to suitably cooperate with the slots and perforations in the longitudinal partitions 2 (Fig. 5).

As shown by Figs. 5 and 15, each transverse partition 3 is provided with a plurality of spaced vertical slots 76 connected with divergent slots 77 to form tab portions 75. The vertical slots 76 of a transverse partition 3 is adapted to fit into a complementary vertical slot 73 of a longitudinal partition 2 and the tab portion 75 is adapted to fit into the T-shaped notch or aperture 74 in the longitudinal partitions to thereby interlock the transverse and longitudinal partitions and minimize accidental separation thereof. The particular slots and perforations shown are illustrative merely and any suitable ones may be utilized. The punches may face in opposite directions, Fig. 4, to insure against accidental separation of partitions.

The dies for forming the slots and tabs in the transverse partitions 3 are shown bolted to a die plate 228 in turn bolted to the bridge member 229 and the openings through the dies are in registry with enlarged slots or openings 230 through the vertical portion of the bridge member so that pieces punched out of the web 14 may pass freely therethrough.

The plurality of punches 20 adapted to form the perforations in the downwardly moving web are bolted to a plate or frame 231, which is in turn bolted to the punch head 232 so as to reciprocate with it. The punch head 232 reciprocates to and fro horizontally in guideways 234 of spaced guide frame member 239 and moves the punches to form the perforations in the web. The portions knocked out of the web fall into a chamber 233 in the bridge member and may be removed therefrom by chutes (not shown).

Horizontal reciprocation of the punch head 232 and the punches 20 is achieved by connecting rods 235 secured to a cross shaft 236 which is pivotally mounted in flanges 237 of the punch head. The lower ends of the connecting rods 235 are bolted to yokes 238 which are oscillated or reciprocated by eccentrics keyed to the shaft 91.

The vertically moving web 14 travels downwardly in step by step movement between the punches and dies. It is stationary during the punching operation and is so coordinated with the movement of the longitudinal partitions that the complementary slots, perforations and tabs interlock with each other.

It will be understood that the web moves downwardly during the interval that the punches 20 and dies 226 are in separated relationship. When the lower edge of the web 14 has moved downwardly into complementary slots in the longitudinal partitions 2 it must be cut off, and the longitudinal partitions advanced one step forwardly so that the next succeeding downwardly moving partition may fit into succeeding slots of the longitudinal partitions. The mechanism for cutting off or shearing the web 14 will next be described.

Shearing of transverse web

Shearing of the web to form transverse partitions 3 is accomplished by cooperating shear blades 240 and 241 bolted to the bridge member 229 and punch head 232. As shown in Figs. 2 and 4, the blade 240 carried by the punch head 232 moves to and fro with the punch head during the formation of perforations in the web 14 by punches 20. The blade 240 slides closely over the upper surface of the shear member 241 secured to the bridge 229 and pushes the clearance knife bar 242 inwardly in opposition to the knife clearance spring 243. The knife clearance spring 243 and knife bar 242 insure removal of stray pieces of paper or cardboard from adjacent the shearing edges of the blades, and the forward edge of the knife bar 242 tends to support the back edge of the web 14 during engagement of the edge of the blade 240 with the web.

Preferably each of the knife blades comprises a steel plate having secured thereto, in a recess, a hardened steel cutting edge 244.

As the punch head 232 moves toward the right in Fig. 2, the punches 20 carried thereby form perforations in a web and a knife blade 240, 241 cut off a section of web previously positioned in cooperating engagement with the longitudinal partitions; thereafter the punch head 232 moves to the left and the web moves downwardly into a succeeding slot in the longitudinal partitions, which has moved into position between the lower edge of the web 14. As the punch head 232 again moves to the right, the punching and shearing operations are again repeated. This operation continues as long as the machine is in operation and a paper web 14 fed down through the stripper plate 225.

Seating of transverse partitions

As the longitudinal partitions move forwardly and carry with them the transverse partitions, it is desirable that means be provided for insuring that the transverse partitions are moved fully downward in the slits of the longitudinal partitions. As shown in the drawings (Figs. 2 and 13) this is accomplished by a tamping mechanism located beyond the shear blade 240.

The tamping mechanism comprises a horizontally disposed shoe 25 bolted or otherwise secured to an upright member or plate holder 246 connected by a link 247 with an arm 248 keyed to a shaft 249 which is supported at opposite sides thereof in apertures of the punch head 232. An arm 250 secured to one end of the shaft 249 is adapted to contact a stop member 252 fixedly secured to the frame of the machine at one side thereof. As the punch head 232 moves toward the right (Fig. 2) one end of the strip arm or lever member 250 moves into contact with the end of the stop member 252 and as movement of the punch head toward the right continues the trip arm 250 is rotated in counter-clockwise direction to correspondingly rotate the shaft 249 and the arm 248, which is fixedly secured thereto. This counter-clockwise rotation of the arm 248 is effective to lower the upright member 246 and move the horizontally positioned shoe 25 downwardly into contact with transverse partitions located beneath the shoe (not shown). The tamper 25 is thus effective to move transverse partitions downwardly the full distance into engagement with the longitudinal partitions.

As the punch head moves to the left, the end of the trip arm 250 rotates in clockwise direction and lift springs 253 secured to the punch head 232 and to spring collar members 254 are effective to turn the arm 250 in clockwise direction and thus raise the upright member 246 and shoe 25

Completed filler units are fed outwardly onto the catch table 26, from which they may be removed and positioned in cartons or folded together and stored for future use.

The preferred embodiment of the machine described in detail hereinabove is particularly adapted to the manufacture of filler units comprising three longitudinal and five transverse partitions; this provides a filler which, when assembled with a carton, forms twenty-four separate cells or pockets for containing articles.

A large variety of filler units may be manufactured by changing the mechanisms at the different stations which form and assemble the longitudinal and transverse partitions. For example, a filler unit with thirty-six pockets or cells may be manufactured by utilizing five sets of complementary punches and dies at perforating station No. 7 and slitters at station No. 8 for cutting a longitudinal web 4 into five partition strips; the five longitudinal partitions will cooperate with five transverse partitions to form thirty-six cells.

When the punches and dies and slitters at stations Nos. 7 and 8 are changed so as to form only two longitudinal partitions, five transverse partitions may be assembled with them to give a unit with only eighteen cells.

If three longitudinal partitions are manufactured and two transverse partitions assembled therewith the resulting filler unit may have twelve cells.

From the foregoing it will be appreciated that a large number of different size filler units may be manufactured by making appropriate changes in the number of partitions. This may be done by changing the mechanisms which form the longitudinal partitions, or by changing the mechanisms which form the transverse partitions, or by changing both the mechanisms which form the longitudinal and transverse partitions.

Desirable differences in feed of the mechanisms at the different stations or locations may be made by utilizing suitable ratchets.

Control mechanism

It is important that the operator of the machine be provided with readily accessible control means for starting and stopping the operation of the machine. In the present instance, this desirable feature is achieved by a control lever 257 pivotally secured to the frame of the machine adjacent the operator's station which is connected by a longitudinal connecting rod 258 with a bell crank 259 pivotally secured to a bracket 260 at the opposite end of the machine. One end of the bell crank member 259 is pivotally connected with the end of the control rod 258 and the other arm thereof is pivotally connected with a cross shaft 261 which is in turn movably pinned to the upper end of a lever member 262. The lever member 262 is pivotally connected at the lower part thereof with the frame of the machine and adjacent the midportion thereof with mechanism for operating the clutch 87 (Fig. 7).

When the control handle 256 of the rod 257 is in the position shown in Fig. 1, the clutch, which may be of any convenient construction, is in disconnected relationship so that the pinion gear 88 is stationary. Since the pinion gear 88 is stationary, this means that the large gear 89 which operates the various mechanisms at the different stations of the machine is likewise stationary, and the machine is at rest. When the handle 256 is moved toward the left (Fig. 1), the connecting rod 258 moves the lever arm 262 so as to bring the parts of the clutch 87 into engagement; this means that the rotating shaft 46 will be connected through the clutch 87 with the pinion gear 88 and the latter is thus effective to put the machine into operation.

The control rod 257 is positioned closely adjacent to the station generally occupied by the machine operator who will normally be at the catch table 26 to remove the partitions from the machine and fold and tie them into bundles.

Modified web punching means

It is desirable in some instances to provide means for mounting punches and dies which are adapted to greater flexibility of use than those previously described in connection with the punches and dies for perforating the longitudinally and transversely moving webs 4 and 14.

In Figs. 19, 20 and 21 there is illustrated a punch plate or frame 265 for mounting punches 266 in an infinite number of positions. The frame or plate member 265 is provided with a longitudinal aperture 267 extending therethrough and a groove or slot 268 adjacent the aperture 267. The punches 266 of this modified form of retaining frame are adapted to fit into a groove 269 and to receive bolts 270 which extend through the aperture 267 and have their heads located within the groove 268 beneath the upper surface of the plate 265. When the bolts are tightened the punches are retained securely in a given position; when it is desired to change the spacing of the punches or use a greater or less number, the bolts may be loosened and the desired number of punches may be spaced at correct intervals by sliding the shank portions of the bolts along the longitudinal aperture 267 after which the bolts can be again tightened and the punches retained securely in position. This construction possesses certain advantages over the type of die mounting plate wherein the punches are adapted to fit in definite positions.

In Figs. 22, 23 and 24 there is illustrated a die mounting plate or frame 272 for receiving and holding in adjustable position the parts 273, 273' of a die. In this modified form of mounting member the shanks of bolts 274 extend through a longitudinal aperture 275 and have their heads located below the outer surface of the plate. The bolts 274 may be tightened to hold the parts of the die in any desired position and the dies may be readily shifted or adjusted to new positions by loosening the bolts and sliding them with the dies through the grooves 275, after which they may be tightened to hold the dies in position.

Adjustment of both punches and dies may be simultaneously achieved by loosening the bolts 270 and 274 which retain the punches and dies in position, lowering the punches 266 into the dies and sliding the punches to the desired position while projecting through the apertures in the dies, after which the bolts of both the punches and dies can be tightened. In this manner the dies are readily maintained in alignment with the punches.

Modified shearing of vertical web

In Figs. 26 and 27 there is illustrated a modified form of the invention which may be utilized to manufacture a plurality of filler units at the same time. That is, the construction shown in these figures is adapted to manufacture a plurality of filler units for use in different cartons or boxes, the filler units may or may not be of the same size.

For purposes of illustration this modification has been shown as embodied in a horizontally reciprocating bridge member 232 having bolted thereto a punch frame or plate 231a carrying punches 20a. The punches 20a are adapted to form perforations in the downwardly moving transverse web in the same manner as described in connection with the preferred embodiment. Four punches are shown in Fig. 26 but any suitable number may be utilized.

A downwardly moving web is adapted to fit into the usual slots of horizontally moving longitudinal partitions (four as shown in Fig. 26) to form a filler unit similarly to the manner as described in the preferred embodiment, but the transverse partition is severed vertically between adjacent punch members 20a by a knife or shear blade 278 bolted to the punch plate 231a. As the punch frame 231a reciprocates to and fro with the punch head 232, the knife or blade 278 carried by the punch head slits or severs a transverse web along a vertical line so that the downwardly moving web which leaves the horizontally reciprocating punch and die members is thus formed into two separate transverse strips or partitions. The two separate partitions assemble with longitudinal partitions in the same manner as previously described in the preferred embodiment and the tamping shoe 25 seats them fully downwardly in like manner.

Preferably the distance between the shear blade 278 and adjacent punches is approximately the same as that between these adjacent punches and other punches carried by the punch head. This construction provides outermost cells of a filler unit with cell walls equal in width to those of interiorly located cells and assists in centering a filler within a carton.

The two filler units thus formed pass outwardly onto the catch table 26, as previously described.

The combined stripper plate and guide unit 225a and the bridge member 229 are provided with elongated aligned apertures or openings for receiving the vertically positioned slitter 278 upon movement thereof toward the right.

The provision of the shear member 278 provides for greater flexibility in the use of the machine by making it possible to manufacture a plurality of filler units of the same or different size simultaneously. It will be understood that the showing of four punches in Fig. 26 is purely for illustrative purposes and that any suitable number may be utilized to form filler units of desired size and number of compartments. Where four longitudinal partitions are assembled with five transverse partitions, the latter being severed vertically by the shear blade 278, there will result two filler units each of which has eighteen cells. Several additional punch and shear mounting members 231a, 228a may be maintained in readiness for quick insertion into the machine to manufacture other filler units having different number of cells. For example, if a mounting member 231a has three punches, with the knife 278 positioned between two of the punches, and if three longitudinal partitions are running through the machine as described in the preferred embodiment, there will result simultaneously manufactured filler units of twelve and eighteen cells. Other sizes may be as readily manufactured.

*Adjustment of head frames*

In order to facilitate adjustment of the mechanisms of the present machine, it is desirable that the head frames or supports 203 shown at the left of Figs. 1 and 2 be longitudinally adjustable along the frame of the machine. Figs. 28 and 29 illustrate a modification for readily achieving such movement of the upright members 203.

The frame member 1a may be provided with a recess within which is suitably secured a rack member 280. The teeth of this rack member 280 mesh with teeth of pinion gears 281 pivotally secured to the upright members 203a located at the opposite sides of the machine. The pinion gears 281 are keyed to a shaft 282 which is in turn provided with a hand wheel 283 at one end thereof. Rotation of the hand wheel 283 causes the pinion gears to turn and this is effective to shift the spaced upright members 203d longitudinally along the frame or bed 1a of the machine. Flanges of the upright members 203a may be provided with elongated apertures or slots 284 through which extend bolts 285 for securing the upright members 203a in fixed position to the frame or bed 1a. When a desired adjustment of the upright head frame members 203a has been obtained, the bolts 285 may be tightened to securely clamp or hold these members in desired position with respect to the frame 1a.

It is believed that the operation of the machine will be clearly understood from the foregoing general and detailed descriptions which bring out both the construction and operation of the entire machine and the mechanism located at the various stations.

It will be seen that the present invention provides a new and improved machine for automatically manufacturing filler units. The machine embodies numerous features and advantages not present in previous machines and is adapted to manufacture a plurality of different filler units simultaneously. Operation of the machine is readily controllable from the operator's station. In addition, the machine is rugged in construction and well able to withstand the rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a machine of the class described, a plurality of cutters for severing a moving paper web into separate strips, means adapted to turn said strips to substantially erect position, and a plurality of fingers intermediate said cutters and said turning means each having rollers adjacent the lower part thereof adapted to contact said strips to thereby control the turning of the strips to said erect position.

2. In a machine of the class described, a plurality of cutters for severing a moving paper web into separate strips, means adapted to turn said strips to substantially on-edge position for assembly with downwardly moving transverse strips, and a plurality of adjustable fingers intermediate said cutters and said turning means each having rollers adjacent the lower part thereof set at an angle to the direction of movement of said strips adapted to contact said strips to thereby control the turning of the strips to said on-edge position.

3. In a machine of the class described having a pair of feed rollers for feeding therebetween a strip of paper in one plane and means spaced from said feed rollers for receiving said strip in a plane angularly disposed with respect to the first plane, a support bar, a support member carried by said support bar adjacent the feed rollers and intermediate the feed rollers and the receiving means, and a strip guide carried by said support member having a strip guiding surface adjacent contiguous portions of said feed rollers and closer to a surface portion of one of said rollers than to another for contacting said strip and pressing it into contact with a portion of the surface of one of said feed rollers.

4. In a machine of the class described having a pair of feed rollers for moving therebetween a strip of paper in one plane and means spaced from said feed rollers for receiving said strip in a plane angularly disposed with respect to the first plane, a support adjacent the feed rollers and intermediate the feed rollers and the receiving means, and a roller carried by said support having its axis of rotation at an angle to the axes of rotation of said feed rollers and having its outer surface laterally offset with respect to contiguous portions of said feed rollers, to thereby press against said strip and maintain it in contact with a surface portion of a feed roller and guide the strip during turning from one plane to the other.

5. In a machine of the class described having a pair of feed rollers for feeding therebetween a strip of paper in one plane and means spaced from said feed rollers for receiving said strip in a plane angularly disposed with respect to the first plane, a finger adjacent said feed rollers and intermediate the feed rollers and the receiving means, means for adjusting said finger to thereby vary the position of a strip guide carried by the finger, and a strip guide carried by said finger with a strip-guiding surface laterally offset from a line of tangency of said feed rollers for contacting said strip and pressing it into contact with a feed roller surface for a distance beyond the line of tangency of the feed rollers.

6. In a machine of the class described having means for feeding and severing a moving paper web into strips while in one plane and means spaced therefrom for receiving moving strips in a plane angularly disposed with respect to the first plane, a plurality of fingers intermediate said severing means and receiving means, and rollers carried by said fingers for contacting said moving strips and guiding them during turning from one plane to the other.

JEWELL G. LOCKE.

REFERENCES CITED

The following references are of record in the file of this patent:

UNITED STATES PATENTS

| Number | Name | Date |
|---|---|---|
| 255,243 | Bowman | Mar. 12, 1882 |
| 507,074 | Macy | Oct. 17, 1893 |
| 710,441 | Diescher | Oct. 7, 1902 |
| 846,716 | Ashelm | Mar. 12, 1907 |
| 1,073,393 | Campus | Sept. 16, 1913 |
| 1,280,367 | Barber | Oct. 1, 1918 |
| 1,460,647 | Fruchter | July 3, 1923 |
| 1,964,827 | Mason et al. | July 3, 1934 |
| 2,080,357 | Jensen | May 11, 1937 |
| 2,092,760 | Jensen et al. | Sept. 14, 1937 |
| 2,151,015 | Davis | Mar. 21, 1939 |
| 2,364,401 | Stellin | Dec. 5, 1944 |